(12) United States Patent  
Sakurai et al.

(10) Patent No.: US 11,292,231 B2  
(45) Date of Patent: Apr. 5, 2022

(54) GLASS SHEET COMPOSITE, AND DIAPHRAGM

(71) Applicant: AGC Inc., Chiyoda-ku (JP)

(72) Inventors: Kento Sakurai, Tokyo (JP); Jun Akiyama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/827,779

(22) Filed: Mar. 24, 2020

(65) Prior Publication Data

US 2020/0238665 A1 Jul. 30, 2020

Related U.S. Application Data

(63) Continuation of application No. PCT/JP2018/037121, filed on Oct. 3, 2018.

(30) Foreign Application Priority Data

Oct. 4, 2017 (JP) .............................. JP2017-194640

(51) Int. Cl.
*B32B 17/10* (2006.01)
*E06B 3/66* (2006.01)

(52) U.S. Cl.
CPC .. *B32B 17/10321* (2013.01); *B32B 17/10036* (2013.01); *B32B 2605/006* (2013.01); *E06B 3/66* (2013.01)

(58) Field of Classification Search
CPC ........ B32B 17/10321; B32B 17/10036; B32B 17/06; B32B 2605/006; H04R 7/08; H04R 7/02; E06B 3/66
See application file for complete search history.

(56) References Cited

U.S. PATENT DOCUMENTS

| 3,724,929 A | * | 4/1973 | Lacy | ...................... B62D 25/06 |
| | | | | 359/886 |
| 5,106,660 A | * | 4/1992 | Vorel | ........................ B44C 5/04 |
| | | | | 40/406 |
| 2006/0267969 A1 | * | 11/2006 | Doi | ................... G02F 1/133512 |
| | | | | 345/204 |

FOREIGN PATENT DOCUMENTS

| JP | 05-227590 A | 9/1993 |
| JP | 06-325868 A | 11/1994 |
| JP | 2009-100223 A | 5/2009 |

(Continued)

OTHER PUBLICATIONS

Machine translation of applicant cited JP 2009-100223. (Year: 2009).*

(Continued)

*Primary Examiner* — Donald J Loney
(74) *Attorney, Agent, or Firm* — Oblon, McClelland, Maier & Neustadt, L.L.P.

(57) ABSTRACT

The glass sheet composite of the present invention includes at least two sheets, a liquid layer held between two adjacent sheets of the at least two sheets, and a seal material disposed between the two sheets so as to seal up the liquid layer, in which at least one of the two sheets is a glass sheet, the glass sheet composite including a light-shielding part disposed so as to overlay a boundary between the liquid layer and the seal material when the glass sheet composite is viewed in a plan view. Because of this, the boundary can be concealed, and this not only results in an improvement in designability and a wider choice of materials for the liquid layer and the seal material.

20 Claims, 6 Drawing Sheets

(56) References Cited

FOREIGN PATENT DOCUMENTS

| JP | 2012-211992 A | 11/2012 |
| JP | 2013-187078 | 9/2013 |

OTHER PUBLICATIONS

Machine translation of applicant cited JP 2012-211992. (Year: 2012).*
International Search Report dated Dec. 18, 2018 in PCT/JP2018/037121 filed on Oct. 3, 2018, 4 pages (with English Translation).
Mal et al., "A Novel Glass Laminated Structure for Flat Panel Loudspeakers", AES 124,7343, May 2008, 6 pages.

* cited by examiner

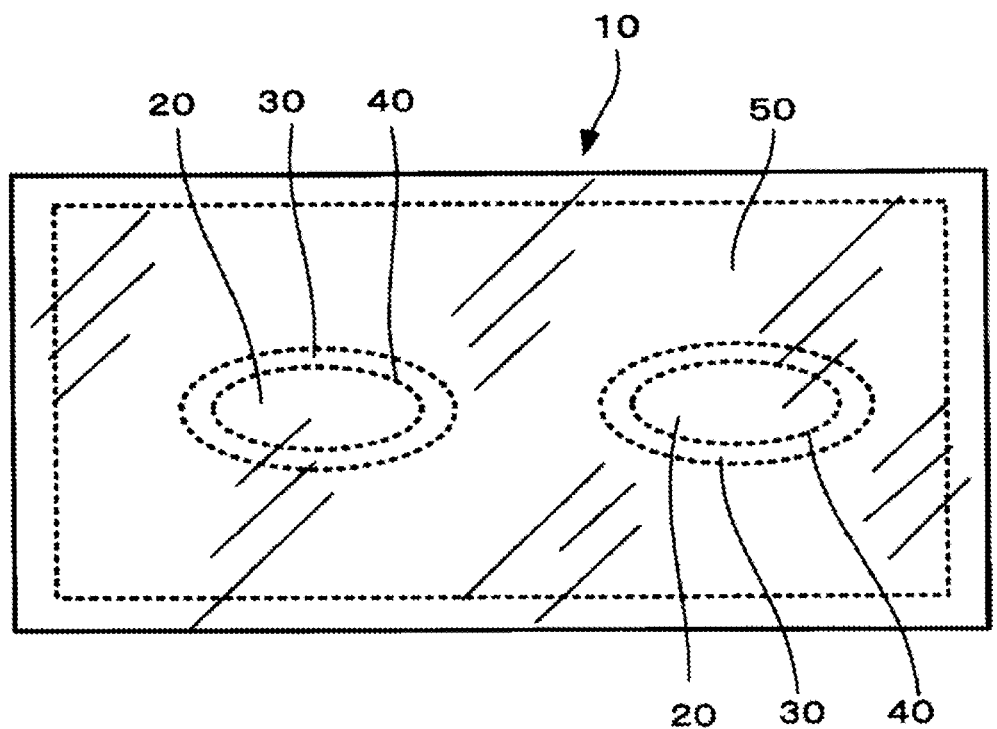

GLASS SHEET COMPOSITE, AND DIAPHRAGM

TECHNICAL FIELD

The present invention relates to a glass sheet composite and a diaphragm.

BACKGROUND ART

A cone paper or resin has been generally used as a diaphragm for loudspeakers or microphones. Such a material has a high loss coefficient, vibration due to resonance hardly occurs therein, and thus, is thought to have good sound reproduction performance in the audible range.

However, since the acoustic velocity is low in any of these materials, when a high frequency causes the material excitation, vibration of the material is less likely to follow the acoustic wave frequency, and divided vibration readily occurs. It is therefore difficult to output a desired sound pressure particularly in a high-frequency range.

In recent years, the range required to be reproduced for a high-resolution sound source, etc. is a high-frequency region of 20 kHz or more. This region is a range supposed to be poorly audible by human ear, but it is preferred that the sonic vibration in the range above can be reproduced with high fidelity, because it provides a stronger emotional impact to a listener, for example, it makes the listener feel a strong realistic sensation.

Accordingly, it may be conceived that a material having a high velocity of sound propagation therethrough, such as a metal, ceramic, or glass, is used in place of the cone paper or resin.

CITATION LIST

Patent Literature

Patent Document 1: JP-A-5-227590

Non-Patent Literature

Non-Patent Document 1: Olivier Mal et. al., "A Novel Glass Laminated Structure for Flat Panel Loudspeakers", AES Convention 124, 7343.

SUMMARY OF INVENTION

Technical Problem

Known as diaphragms for loudspeakers are a diaphragm including one glass sheet (Patent Document 1) and a laminated glass having a butyral-based resin layer between two glass sheets (Non-Patent Document 1).

Especially in glass sheet composites such as the laminated glass proposed in Non-Patent Document 1, there is a concern that the seal material used for laminating the two glass sheets deteriorates due to light, resulting in a decrease in the durability of the glass sheet composite.

Accordingly, an object of the present invention is to provide a glass sheet composite and a diaphragm which have excellent durability.

Solution to Problem

[1] The glass sheet composite of the present invention includes at least two sheets, a liquid layer held between two adjacent sheets of the at least two sheets, and a seal material disposed between the two sheets so as to seal up the liquid layer, in which at least one of the two sheets is a glass sheet, the glass sheet composite including a light-shielding part disposed so as to overlay a boundary between the liquid layer and the seal material when the glass sheet composite is viewed in a plan view.

[2] The glass sheet composite according to [1], in which the seal material is provided to at least some of peripheries of the two sheets, and the light-shielding part is provided to at least some of the peripheries of the two sheets so as to overlay the boundary.

[3] The glass sheet composite according to [1], in which the seal material is provided to peripheries of the two sheets and the light-shielding part is provided to the whole peripheries of the two sheets so as to overlay the boundary.

[4] The glass sheet composite according to any one of [1] to [3], in which the two sheets include a first sheet that is constituted of a glass sheet, and a second sheet that is constituted of a transparent plate and the light-shielding part is provided to at least one main surface of the first sheet.

[5] The glass sheet composite according to any one of [1] to [3], in which the two sheets include a first sheet that is constituted of a glass sheet, and a second sheet that is constituted of a transparent plate and the light-shielding part is provided to at least one main surface of the second sheet.

The diaphragm of the present invention according to any one of [1] to [5] includes the glass sheet composite and at least one vibrator disposed on one or both surfaces of the glass sheet composite.

Advantageous Effects of Invention

According to the glass sheet composite of the present invention, by concealing the seal material with the light-shielding part, deterioration of the seal material due to light is prevented and the glass sheet composite can hence has improved durability.

BRIEF DESCRIPTION OF DRAWINGS

FIG. 1A is a front view and FIG. 1B is a cross-sectional view along A-A of FIG. 1A.

FIG. 2A is a front slant view, FIG. 2B is a cross-sectional view along A-A of FIG. A and indicates Example 1, and FIG. 2C is a cross-sectional view along A-A of FIG. A and indicates Example 2.

FIGS. 3A, 3B, 3C, 3D and 3E are partial cross-sectional views respectively indicating Example 3, Example 4, Example 5, Example 6, and Example 7.

FIGS. 4A, 4B, 4C and 4D are partial cross-sectional views respectively indicating Example 8, Example 9, Example 10, and Example 11.

FIG. 5A is a diagrammatic view showing an example in which a second sheet having a light-shielding part disposed thereon beforehand is bonded to a first sheet and FIG. 5B is a diagrammatic view showing an example in which a seal material adheres to main surfaces of two sheets, with light-shielding parts interposed therebetween.

FIG. 6 is a plan view showing an example of the glass sheet composite according to the present invention, in which the liquid layer has been disposed in a different arrangement.

DESCRIPTION OF EMBODIMENTS

Figure 1A:
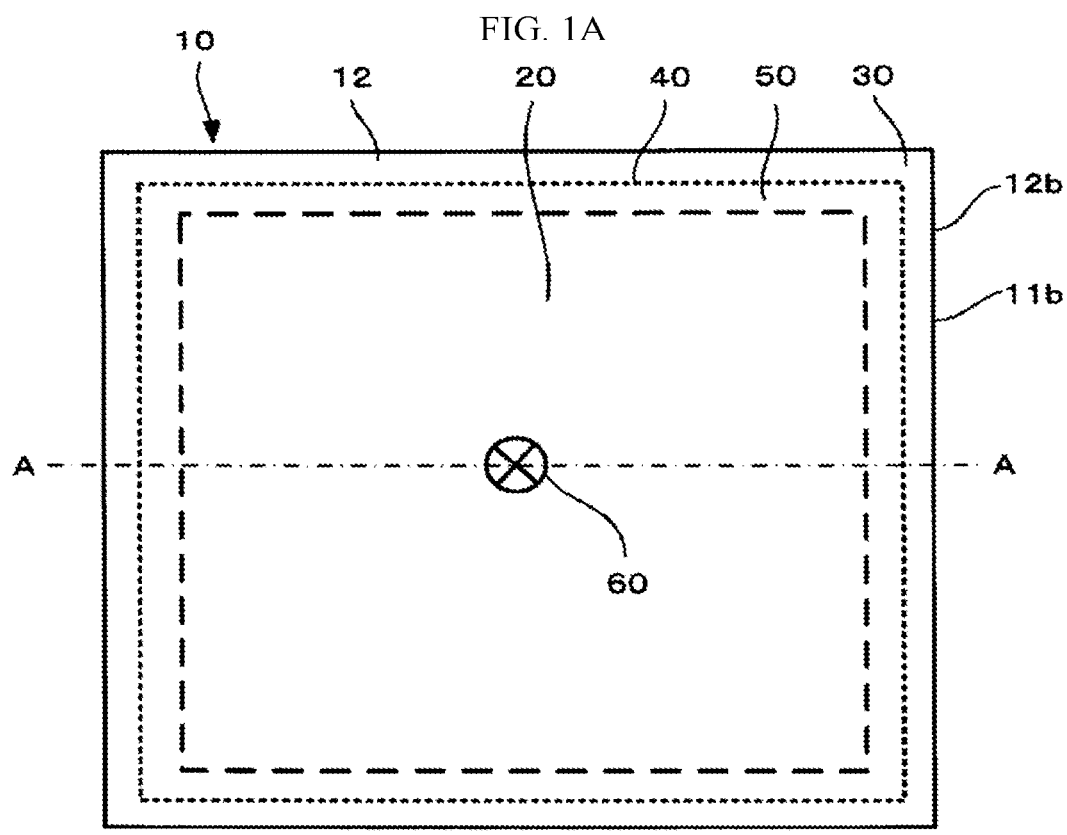
FIGS. 1A and 1B show an example of the glass sheet composite according to the present invention.

Details and other features of the present invention are described below based on embodiments of the present invention. Here, in the following drawings, the same or corresponding reference numeral is assigned to the same or corresponding members or parts, and duplicated description is thereby omitted. In addition, unless otherwise specified, the drawings are not intended to show a relative ratio among members or parts. Accordingly, specific dimensions may be properly selected in the context of the following non-limiting embodiments.

Furthermore, "–" indicating a numerical range in the present description is used in the sense of including the numerical values set forth before and after the "–" as a lower limit value and an upper limit value.

(Outline of the Glass Sheet Composite)

The glass sheet composite of the present invention includes at least two sheets, a liquid layer held between two adjacent sheets of the at least two sheets, and a seal material disposed between the two sheets so as to seal up the liquid layer, in which at least one of the two sheets is a glass sheet, the glass sheet composite including a light-shielding part disposed so as to overlay a boundary between the liquid layer and the seal material when the glass sheet composite is viewed in a plan view.

By disposing a light-shielding part so as to overlay a boundary between the liquid layer and the seal material, the boundary can be concealed. This not only results in an improvement in designability and a wider choice of materials for the two members but also makes it possible to attain preferred visibility. Namely, there is no need of matching refractive index of the liquid layer and that of the seal material with each other to make the boundary therebetween invisible, and the freedom of selecting materials to be used can be improved. By concealing the seal material with the light-shielding part, the seal material can be prevented from a deterioration due to light. When this glass sheet composite is mounted in an display device such as a TV, monitor, smartphone terminal, tablet terminal, or PC terminal, the joint surfaces of the glass sheet composite and frame surrounding the glass sheet composite can be integrated in color.

When the seal material has been provided to at least some of the peripheries of the two sheets, it is preferable that the light-shielding part has been partly disposed likewise. When the seal material has been provided to the peripheries of the two sheets, it is preferable that the light-shielding part also has been disposed along the whole peripheries of the two sheets. Especially when the seal material has been provided to the whole peripheries of the two sheets, the liquid layer held inside the seal material does not leak out and the glass sheet composite has improved quality.

It is preferable that the glass sheet composite according to the present invention has a loss coefficient at 25° C. of $1\times10^{-2}$ or higher and that at least one sheet has a sheet-thickness-direction longitudinal wave acoustic velocity of $4.0\times10^3$ m/s or higher. Having a high loss coefficient means that the vibration damping capacity is high.

As for the loss coefficient, a value calculated by a half-width method is used. Denoting f as the resonant frequency of a material and W as a frequency width at a point decreased by −3 dB from the peak value of the amplitude h (namely, the point of (maximum amplitude)−3 [dB]), the loss coefficient is defined as a value represented by {W/f}.

In order to prevent the resonance, the loss coefficient may be increased, namely, this means that the frequency width W becomes relatively large with respect to the amplitude h and the peak becomes broader.

Loss coefficient is a value inherent in a material, etc. For example, in the case of a glass sheet alone, the loss coefficient varies depending on the composition, relative density, etc. thereof. Loss coefficient can be determined by a dynamic modulus test such as a resonance method.

The term "longitudinal wave acoustic velocity" means a velocity at which a longitudinal wave propagates in an object. The longitudinal wave acoustic velocity can be measured by the ultrasonic pulse method described in Japanese Industrial Standards (JIS-R1602-1995).

(Liquid Layer)

Since the glass sheet composite according to the present invention includes a layer made of a liquid (liquid layer) disposed between at least two sheets (at least a pair of sheets), a high loss coefficient can be achieved. In particular, the loss coefficient can be made larger by controlling the viscosity and surface tension of the liquid layer to fall within suitable ranges. This is considered attributed to the fact that, unlike the case of disposing a pair of sheets with an adhesive layer interposed therebetween, the pair of sheets is not fixed and continues maintaining the vibration characteristics of each individual sheet.

The liquid layer preferably has a viscosity coefficient at 25° C. of $1\times10^{-4}$ to $1\times10^3$ Pa·s and a surface tension at 25° C. of 15-80 mN/m. In case where the viscosity thereof is too low, this liquid layer is less apt to transmit vibrations. In case where the viscosity thereof is too high, the two sheets respectively on both sides of the liquid layer are fixed to exhibit a vibration behavior as one sheet, becoming less effective in damping vibration due to resonance. Meanwhile, in case where the surface tension thereof is too low, the sheets have reduced adhesion therebetween and are less apt to transmit vibrations. In case where the surface tension thereof is too high, the two sheets respectively on both sides of the liquid layer are apt to be fixed to exhibit a vibration behavior as one sheet, becoming less effective in damping vibration due to resonance.

The liquid layer has a viscosity coefficient at 25° C. of more preferably $1\times10^{-3}$ Pa·s or higher, still more preferably $1\times10^{-2}$ Pa·s or higher. The liquid layer preferably has a viscosity coefficient at 25° C. of more preferably $1\times10^2$ Pa·s or less, still more preferably $1\times10$ Pa·s or less.

The liquid layer has a surface tension at 25° C. of more preferably 17 mN/m or higher, still more preferably 30 mN/m or higher.

The viscosity coefficient of the liquid layer can be measured with a rotational viscometer, etc. The surface tension of the liquid layer can be measured by a ring method, etc.

In case where the liquid layer has too high a vapor pressure, some of this liquid layer may vaporize, making the glass sheet composite unable to perform its function. The liquid layer hence has a vapor pressure at 25° C. and 1 atm of preferably $1\times10^4$ Pa or less, more preferably $5\times10^3$ Pa or less, still more preferably $1\times10^3$ Pa or less.

The liquid layer having smaller thickness is preferred from the standpoints of enabling the glass sheet composite to retain high rigidity and of transmitting vibrations. Specifically, when the total thickness of the two sheets is 1 mm or less, the liquid layer has a thickness of preferably 1/10 or less, more preferably 1/20 or less, still more preferably 1/30 or less, yet still more preferably 1/50 or less, even still more preferably 1/70 or less, even yet still more preferably 1/100 or less, of the total thickness of the two sheets.

In the case where the total thickness of the two sheets exceeds 1 mm, the liquid layer has a thickness of preferably 100 μm or less, more preferably 50 μm or less, still more preferably 30 μm or less, yet still more preferably 20 μm or less, even still more preferably 15 μm or less, even yet still more preferably 10 μm or less.

A lower limit of the thickness of the liquid layer is preferably 0.01 μm or larger from the standpoints of production efficiency and durability.

It is preferable that the liquid layer is chemically stable and does not react with either of the two sheets lying respectively on both sides of the liquid layer. The term "chemically stable" means, for example, that the liquid layer is less apt to be altered (deteriorated) by light irradiation and undergoes none of solidification, vaporization, decomposition, discoloration, chemical reaction with the glass, and the like at least in the temperature range of −20° C. to 70° C.

Examples of ingredients usable as the liquid layer include water, oils, organic solvents, liquid polymers, ionic liquids, and mixtures of two or more of these.

More specific examples thereof include propylene glycol, dipropylene glycol, tripropylene glycol, straight silicone oils (dimethyl silicone oil, methyl phenyl silicone oil, and methyl hydrogen silicone oil), modified silicone oils, acrylic-acid-based polymers, liquid polybutadiene, glycerin paste, fluorochemical solvents, fluororesins, acetone, ethanol, xylene, toluene, water, mineral oil, and mixtures of two or more of these. It is preferable that the liquid layer includes at least one member selected from the group consisting of a dimethyl silicone oil, a methyl phenyl silicone oil, a methyl hydrogen silicone oil, and modified silicone oils, among those. It is more preferable that the liquid layer includes propylene glycol or a silicone oil as a main component.

Also usable as the liquid layer besides those ingredients is a slurry containing particles dispersed therein. Although the liquid layer preferably is a homogeneous fluid from the standpoint of improving the loss coefficient, the slurry is effective in the case of imparting design attractiveness or a function, such as coloration or fluorescence, to the glass sheet composite.

The content of the particles in the liquid layer is preferably 0-10 vol %, more preferably 0-5 vol %.

The particles have a particle diameter of preferably 10 nm to 10 μm, more preferably 0.5 m or less, from the standpoint of preventing sedimentation.

The liquid layer may contain a fluorescent material from the standpoint of imparting design attractiveness or a function. This liquid layer may be either a slurry liquid layer which contains a particulate fluorescent material dispersed therein or a homogeneous liquid layer in which a liquid fluorescent material has been mixed. Accordingly, the optical function, such as absorbing light and emitting light can be imparted to the glass sheet composite.

(Seal Material)

The seal material is disposed between the two sheets so that the liquid layer held between the two sheets is sealed up. A light-shielding part is disposed so as to overlay a boundary between the liquid layer and the seal material when the glass sheet composite is viewed in a plan view.

When the seal material has been provided to at least some of the peripheries of the two sheets, it is preferable that the light-shielding part has been partly disposed likewise. When the seal material has been provided to the peripheries of the two sheets, it is preferable that the light-shielding part also has been disposed along the whole peripheries of the two sheets. Especially when the seal material has been provided to the whole peripheries of the two sheets, the liquid layer held inside the seal material does not leak out and the glass sheet composite has improved quality.

The seal material preferably includes at least one member selected from the group consisting of a poly(vinyl acetate)-based material, a poly(vinyl chloride)-based material, a poly(vinyl alcohol)-based material, an ethyl ene-copolymer-based material, a poly(acrylate)-based material, a cyano-acrylate-based material, a saturated-polyester-based material, a polyamide-based material, a linear-polyimide-based material, a melamine resin, a urea resin, a phenolic resin, an epoxy-based material, a polyurethane-based material, an unsaturated-polyester-based material, a reactive acrylic material, a rubber-based material, a silicone-based material, and a modified-silicone-based material.

(Light-Shielding Part)

A light-shielding part has been disposed so as to overlay a boundary between the liquid layer and the seal material when the glass sheet composite is viewed in a plan view. Because of this, the boundary can be concealed, and this not only results in an improvement in designability and a wider choice of materials for the two members but also makes it possible to attain preferred visibility. Namely, there is no need of matching refractive index of the liquid layer and that of the seal material with each other to make the boundary therebetween invisible, and the freedom of selecting materials to be used can be improved. By concealing the seal material with the light-shielding part, the seal material can be prevented from deterioration due to light and the glass sheet composite can have improved durability.

The light-shielding part can be selected from among metallic fillers such as silver, copper, and aluminum (specifically, resins containing metallic fillers such as silver, copper, and aluminum), films of metals such as silver, copper, and aluminum, primer materials including a coating material or pigment, curable resinous ingredients, coloring primers, etc. The coloring primer can be used for concealing the boundary because it can be colored with a dye or a pigment, it makes it unnecessary to render the boundary unnoticeable by matching the refractive index of the liquid layer and that of the seal material with each other. The freedom of selecting materials for the liquid layer and seal material is hence improved. The primer can be made to have the same color as the frame of, for example, a TV, monitor, terminal, etc., and hence an improvement in color designability can be attained. Besides being black or white, the color may be a metallic glossy color such as silver or gold. The light-shielding part may be one with metallic glossiness formed by applying an electroconductive curable resin containing a metallic filler such as silver, copper, or aluminum, or by depositing a film of a metal such as silver, copper, or aluminum. With such colored light-shielding parts, an improvement in designability can be aimed at. Preferred coloring primers are curable-resin agents, and it is especially preferred to employ heat curing, ultraviolet curing, visible-light curing, moisture curing, or the like.

The light-shielding part is provided to either of the sheets, on the main surface thereof where the liquid layer is to lie or on the other main surface thereof. When the light-shielding part is provided to the main surface where the liquid layer is to lie, that is, when the seal material is disposed on the light-shielding part, then the strength of adhesion between the seal material and the sheet improves. The light-shielding part may have been provided to a main surface of either of the two sheets or to a main surface of each of both sheets. The light-shielding part may have been provided to only one of the main surfaces of at least either of the two sheets or to each of both main surfaces thereof.

(Sheets and Glass Sheet)

The glass sheet composite according to the present invention includes at least two (at least a pair of) sheets disposed so as to sandwich the liquid layer therebetween. At least one of the two sheets is a glass sheet. In this configuration, when either of the sheets resonates, the presence of the liquid layer can prevent the other sheet from resonating or can damp the resonant vibration of the other sheet. The glass sheet composite can hence have a higher loss coefficient than single glass sheets.

It is preferable that, of one of the two sheets constituting the pair of sheets, one sheet and the other sheet have different peak top value of resonant frequency. It is more preferable that the ranges of resonant frequency of the two sheets do not overlap each other. However, even though the range of resonant frequency of one sheet and that of the other sheet overlap each other or the two sheets have the same peak top value, the presence of the liquid layer prevents the resonance of one sheet from causing synchronous vibration to the other sheet and thereby reduces the resonance to some degree. A high loss coefficient can hence be obtained as compared with the case of single glass sheets.

More specifically, denoting $Qa$ and $wa$ respectively as the resonant frequency (peak top) and the half-width of resonance amplitude of one of the sheets and denoting $Qb$ and $wb$ respectively as the resonant frequency (peak top) and the half-width of resonance amplitude of the other sheet, it is preferable that the relationship represented by the following formula (1) is satisfied.

$$(wa+wb)/4 < |Qa-Qb| \quad (1)$$

The larger the value of the left side of formula (1), the larger the difference ($|Qa-Qb|$) in resonant frequency between the two sheets and the higher the loss coefficient. It is hence preferable that the two sheets have such properties.

Accordingly, it is more preferable that the following formula (2) is satisfied, and it is still more preferable that the following formula (3) is satisfied.

$$(wa+wb)/2 < |Qa-Qb| \quad (2)$$

$$(wa+wb)/1 < |Qa-Qb| \quad (3)$$

The resonant frequency (peak top) and half-width of resonance amplitude of each sheet can be determined by the same method as the loss coefficient of the glass sheet composite.

It is preferred that the mass difference between one sheet and the other sheet is smaller, and it is more preferred that there is no mass difference therebetween. In cases when the sheets have different mass, the resonance of the lighter sheet can be reduced by the heavier sheet but it is difficult to reduce the resonance of the heavier sheet by the lighter sheet. This is because if the mass ratio is imbalanced, vibrations due to resonance cannot theoretically be mutually eliminated because of the difference in inertial force.

The mass ratio between the two sheets which is represented by (one sheet)/(the other sheet) is preferably 0.1-10.0 (from 1/10 to 10/1), more preferably 0.5-2.0 (from 5/10 to 10/5), even more preferably 1.0 (10/10; mass difference, 0).

The smaller the thicknesses of one sheet and the other sheet, the more likely the sheets are to adhere to each other with the liquid layer interposed therebetween and the smaller the amount of energy necessary for vibrating the sheets. Hence, for use in diaphragm applications as in loudspeakers, the smaller the sheet thicknesses, the better. Specifically, the sheet thickness of each of the two sheets is preferably 15 mm or less, more preferably 10 mm or less, still more preferably 5 mm or less, yet still more preferably 3 mm or less, even still more preferably 1.5 mm or less, even yet still more preferably 0.8 mm or less. Meanwhile, if the thickness is too small, the impact of surface defects of the sheets becomes noticeable, cracks are likely to occur, and strengthening treatment becomes difficult. Hence, the thickness thereof is preferably 0.01 mm or larger, more preferably 0.05 mm or larger.

For use in opening member applications in buildings or vehicles, which are reduced in the occurrence of an abnormal noise attributed to a resonance phenomenon, the thicknesses of one sheet and the other sheet are each preferably 0.5-15 mm, more preferably 0.8-10 mm, still more preferably 1.0-8 mm.

It is preferable, for use in diaphragm applications, that one sheet and/or the other sheet has a high loss coefficient, because this enables the glass sheet composite to show enhanced vibration damping. Specifically, the loss coefficient at 25° C. of the sheet(s) is preferably $1 \times 10^{-4}$ or higher, more preferably $3 \times 10^{-4}$ or higher, still more preferably $5 \times 10^{-4}$ or higher. There is no particular upper limit, but the loss coefficient thereof is preferably $5 \times 10^{-3}$ or less from the standpoints of productivity and manufacturing cost. It is more preferable that both the one sheet and the other sheet have that loss coefficient.

The loss coefficient of each sheet can be determined by the same method as the loss coefficient of the glass sheet composite.

It is preferable, for use in diaphragm applications, that one sheet and/or the other sheet has a high longitudinal wave acoustic velocity in the sheet thickness direction, because the sound reproducibility in a high-frequency region is enhanced. Specifically, the longitudinal wave acoustic velocity of the sheet(s) is preferably $4.0 \times 10^3$ m/s or higher, more preferably $5.0 \times 10$ m/s or higher, still more preferably $6.0 \times 10^3$ m/s or higher. There is no particular upper limit, but the longitudinal wave acoustic velocity thereof is preferably $7.0 \times 10^3$ m/s or less from the standpoints of sheet productivity and raw material cost. It is more preferable that both the one sheet and the other sheet satisfy that acoustic velocity.

The acoustic velocity of each sheet can be measured by the same method as the longitudinal wave acoustic velocity of the glass sheet composite.

In the glass sheet composite according to the present invention, one sheet or the other sheet, or both sheets is/are constituted of a glass sheet. The material of the other sheet is not limited, and use can be made of any of various transparent plates including resinous sheets and transparent resins (referred to also as "organic glasses"). From the standpoints of design attractiveness and processability, it is preferred to use a resinous sheet or a composite material thereof. Especially preferred is to use a resinous sheet made of an acrylic resin, a polyimide resin, a polycarbonate resin, a PET resin, or an FRP material.

The composition of the glass sheet constituting at least one sheet is not particularly limited. However, the contents of components thereof are, for example, preferably in the following ranges.

40-80 mass % $SiO_2$, 0-35 mass % $Al_2O_3$, 0-15 mass % $B_2O_3$, 0-20 mass % MgO, 0-20 mass % CaO, 0-20 mass %

SrO, 0-20 mass % BaO, 0-20 mass % $Li_2O$, 0-25 mass % $Na_2O$, 0-20 mass % $K_2O$, 0-10 mass % $TiO_2$, and 0-10 mass % $ZrO_2$. These components account for at least 95 mass % of the entire glass.

More preferably, the glass sheet has the composition including the following components in amounts within the following ranges.

55-75 mass % $SiO_2$, 0-25 mass % $Al_2O_3$, 0-12 mass % $B_2O_3$, 0-20 mass % MgO, 0-20 mass % CaO, 0-20 mass % SrO, 0-20 mass % BaO, 0-20 mass % $Li_2O$, 0-25 mass % $Na_2O$, 0-15 mass % $K_2O$, 0-5 mass % $TiO_2$, and 0-5 mass % $ZrO_2$. These components account for at least 95 mass % of the entire glass.

A specific modulus is a value obtained by dividing the Young's modulus by the density, and the higher the specific modulus of the glass sheet, the higher the rigidity of the glass sheet. Specifically, the glass sheet has the specific modulus of preferably $2.5 \times 10^7$ $m^2/s^2$ or higher, more preferably $2.8 \times 10^7$ $m^2/s^2$ or higher, still more preferably $3.0 \times 10^7$ $m^2/s^2$ or higher. Although there is no particular upper limit, the specific modulus thereof is preferably $4.0 \times 10^7$ $m^2/s^2$ or less from the standpoint of formability during glass production. The Young's modulus can be determined by the ultrasonic pulse method described in Japanese Industrial Standards (JIS-R1602-1995).

The lower the specific gravity of each glass sheet, the smaller the amount of energy necessary for vibrating the glass sheet. Specifically, the glass sheet has the specific gravity of preferably 2.8 or less, more preferably 2.6 or less, still more preferably 2.5 or less. Although there is no particular lower limit, the specific gravity thereof is preferably 2.2 or higher.

(Glass Sheet Composite)

It is possible to color at least one of the sheets and/or the liquid layer, which constitute the glass sheet composite. This is useful in the case where design attractiveness or a function, such as IR cut, UV cut, or privacy glass, is desired to be given to the glass sheet composite.

At least one glass sheet suffices for the sheets constituting the glass sheet composite, but two or more glass sheets may be used. In this case, glass sheets which all differ in composition may be used or glass sheets which all have the same composition may be used. Glass sheets having the same composition may be used in combination with a glass sheet having a different composition. Among others, it is preferred to use two or more kinds of glass sheets differing in composition, from the standpoint of vibration damping.

Similarly, as to the mass and thickness, the glass sheets may be all different, may be all the same, or some may be different. Above all, from the standpoint of vibration damping, all of the constituent glass sheets preferably have the same mass.

A physically strengthened glass sheet or a chemically strengthened glass sheet may be used as at least one of the glass sheets constituting the glass sheet composite. This is useful in preventing the glass sheet composite from breaking. When an increase in the strength of the glass sheet composite is desired, it is preferable that a physically strengthened glass sheet or a chemically strengthened glass sheet is used as the glass sheet located in an outermost surface of the glass sheet composite, and it is more preferable that all of the constituent glass sheets are each a physically strengthened glass sheet or a chemically strengthened glass sheet.

From the standpoint of increasing the longitudinal wave acoustic velocity and the strength, it is also useful to use crystallized glass or phase-separated glass as a glass sheet. Especially when an increase in the strength of the glass sheet composite is desired, it is preferred to use the crystallized glass or phase-separated glass as the glass sheet located in an outermost surface of the glass sheet composite.

A coating or a film may be formed on at least one outermost surface of the glass sheet composite, so long as the effects of the present invention are not impaired. Formation of a coating or attachment of a film is suitable for scratch protection, etc.

It is preferred that the coating or film has a thickness of ⅕ or less of the sheet thickness of the surface glass sheet. The coating and the film can be conventionally known ones. Examples of the coating include a water-repellent coating, a hydrophilic coating, a water sliding coating, an oil-repellent coating, a light reflection preventive coating, a heat shielding coating, and a highly reflective coating. Examples of the film include a shatterproof film for glass, a color film, a UV cut film, an IR cut film, a heat-shielding film, an electromagnetic wave shielding film, and a screen film for projectors.

The shape of the glass sheet composite can be appropriately designed in accordance with applications, and may be a flat plate-like shape or a curved surface shape. The shape thereof may be a rectangular, triangular, circular, or polygonal shape, etc. in a plan view.

In order to raise the output sound pressure level in a low-frequency range, the glass sheet composite can be made to have a structure including an enclosure or a baffle plate. Although the material of the enclosure or baffle plate is not particularly limited, it is preferable to use the glass sheet composite of the present invention.

A frame may be provided to at least one outermost surface of the glass sheet composite so long as the effects of the present invention are not impaired. The frame is useful, for example, when it is desired to enhance the rigidity of the glass sheet composite or maintain a curved surface shape. As the material of the frame, a conventionally known material may be used. For example, use can be made of ceramics and single-crystal materials such as $Al_2O_3$, SiC, $Si_3N_4$, AlN, mullite, zirconia, yttria, and YAG, metal and alloy materials such as steel, aluminum, titanium, magnesium, and tungsten carbide, composite materials such as FRPs, resin materials such as acrylics and polycarbonates, glass materials, and wood.

The frame to be used has a weight preferably 20% or less, more preferably 10% or less, of the weight of the glass sheet.

A seal member may be interposed between the glass sheet composite and the frame. Furthermore, at least some of an outer circumferential edge portion of the glass sheet composite may be sealed by a seal member which does not hinder the glass sheet composite from vibrating. As the seal members, use can be made of a highly elastic rubber, a resin, a gel, etc.

As the resin for the seal members, use can be made of acrylic, cyanoacrylate-based, epoxy-based, silicone-based, urethane-based, and phenolic resins. Examples of curing methods include one-pack type, two-pack mixing type, heat curing, ultraviolet curing, and visible light curing.

A thermoplastic resin (hot-melt bond) is also usable. Examples thereof include (ethylene/vinyl acetate)-based, polyolefin-based, polyamide-based, synthetic rubber-based, acrylic, and polyurethane-based resins.

As the rubber, use can be made of natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber (Hypalon), urethane rubber, silicone rubber, fluororubber, ethylene-vinyl acetate rubber, epichlorohydrin rubber, polysulfide rubber (Thiokol), and hydrogenated nitrile rubber.

In case where the thickness t of each seal member is too small, sufficient strength is not ensured. In case where the thickness t thereof is too large, the seal member may hinder vibrations. Consequently, the seal material has the thickness of is preferably 10 m or larger and up to 5 times the overall thickness of the glass sheet composite, and is more preferably 50 m or larger and smaller than the overall thickness of the glass sheet composite.

At least some portions of the opposed surfaces of the sheets may be coated with the seal member in order to, for example, prevent separation at the interface between each sheet and liquid layer of the glass sheet composite, so long as the effects of the present invention are not impaired. In this case, the area of the seal member-coated portion is preferably 20% or less, more preferably 10% or less, still more preferably 5% or less, of the area of the liquid layer so as not to hinder vibrations.

In order to enhance the sealing performance, edge portions of each sheet can be processed into an appropriate shape. For example, edge portions of at least one of the sheets may be processed by C-chamfering (the sheet has a trapezoidal cross-sectional shape) or R-chamfering (the sheet has an approximately arc cross-sectional shape), thereby increasing the area of contact between the seal member and the sheet. Thus, the strength of adhesion between the seal member and the sheet can be enhanced.

(Diaphragm)

The diaphragm of the present invention preferably includes the glass sheet composite and at least one vibrator disposed on one or both surfaces of the glass sheet composite.

The diaphragm can be made to function as a loudspeaker, a microphone, an earphone, or a casing's vibrating body or casing's speaker of a mobile device, etc. by disposing, for example, one or more vibration elements or vibration detection elements (vibrators) on one side or both sides of the glass sheet composite. In order to enhance the output sound pressure level, two or more vibration elements are preferably disposed on both sides of the glass sheet composite.

In general, the position of the vibrators in the diaphragm is preferably the central portion of the glass composite, but since the material has a high acoustic velocity and a high damping performance, the vibrator may be disposed at an edge portion of the glass sheet composite. Use of the diaphragm according to the present invention can facilitate reproduction of the sound in a high-frequency region that had been conventionally difficult to be reproduced. In addition, since size, shape, color and the like of the glass sheet composite can be freely selected, a design can be applied thereto, so that a diaphragm with excellent design can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled.

At this time, in the case where the sound or vibration characteristics at the sampling point above are caused to undergo a change based on a certain acoustic transfer function in the course of propagating to the glass sheet composite, and in the case where an acoustic conversion transfer function is present in the glass sheet composite, the vibration can be accurately amplified or canceled by correcting the amplitude and phase of the control signal by means of a control filter. At the time of constructing the control filter above, for example, the least-square (LMS) algorithm can be used.

In a more specific configuration, for example, the glass sheet composite of the present invention is used as all or at least one of the glass sheets of a multilayered-glass. A structure can be thus produced in which the vibration level of the sheet at the inflow side of a sonic vibration to be controlled or the sound pressure level of a space present between glasses is sampled and, after appropriate signal correction by a control filter, output to a vibration element on the glass sheet composite disposed at the outflow side of the sonic vibration.

This diaphragm can be utilized, for example, as a member for electronic devices, in a full-range loudspeaker, a loudspeaker for reproducing a low-pitched sound range of 15 Hz to 200 Hz, a loudspeaker for reproducing a high-pitched sound range of 10 kHz to 100 kHz, a large loudspeaker having a diaphragm area of 0.2 m$^2$ or more, a small loudspeaker having a diaphragm area of 3 cm$^2$ or less, a flat loudspeaker, a cylindrical loudspeaker, a transparent loudspeaker, a mobile device cover glass functioning as a loudspeaker, a TV display cover glass, a display outputting video signals and audio signals from the same surface, a loudspeaker for wearable displays, an electronic display device, and lighting equipment. In addition, the diaphragm can be used as a diaphragm or vibration sensor for headphones, earphones or microphones.

This diaphragm can be used as an interior vibration member of transport machinery such as vehicle, or as an in-vehicle/in-machine loudspeaker and can form, for example, a side-view mirror, a sun visor, an instrument panel, a dashboard, a ceiling, a door, or other interior panels, each functioning as a loudspeaker. In addition, such a member can also be made to function as a microphone and a diaphragm for active noise control.

With respect to other uses, the diaphragm can be used as a diaphragm for ultrasonic generators, a slider for ultrasonic motors, a low frequency generator, a vibrator for propagating sonic vibration in liquid, a water tank and a container each using the vibrator, a vibration element, a vibration detection element, and an actuator material for vibration damping equipment.

(Method for Producing the Glass Sheet Composite)

The glass sheet composite according to the present invention can be obtained by disposing a light-shielding part, a liquid layer, and a seal material for sealing up the liquid layer, between a pair of sheets.

Examples of methods of application for the light-shielding part and seal material include application with a dispenser, screen printing, spray coating, and application with a spreader. Application with a dispenser is preferred from the standpoints of application thickness and evenness in the width of lines formed by the application. It is also possible to form a shielding coating film by vacuum deposition or sputtering.

Formation of the liquid layer also is not particularly limited. For example, a liquid for constituting the liquid layer can be applied to a sheet surface with a dispenser or by a technique such as spin coating, die coating, screen printing, or ink-jet printing.

(Embodiments of the Glass Sheet Composite)

Figure 1B:
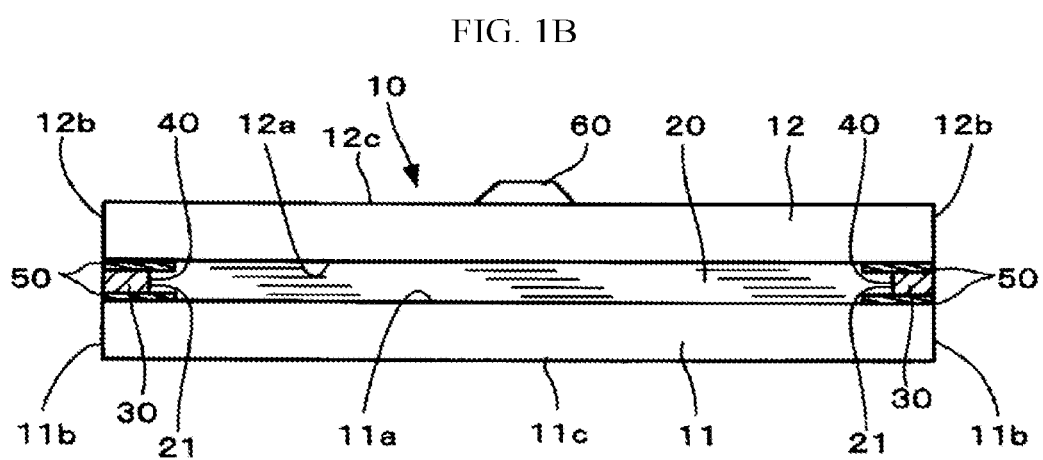

FIGS. 1A and 1B show an example of a glass sheet composite 10 of the present invention. FIG. 1A is a front view, and FIG. 1B is a cross-sectional view along line A-A of FIG. 1A.

The glass sheet composite 10 includes: a first sheet 11 and a second sheet 12, as at least two sheets; a liquid layer 20 held between the first sheet 11 and the second sheet 12; a seal material 30 which seals up the liquid layer 20; and a light-shielding part 50 disposed so as to overlay a boundary between the liquid layer 20 and the seal material 30. At least one of the two sheets, i.e., the first sheet 11 and the second sheet 12, is constituted of a glass sheet and the other sheet is constituted of a transparent plate. In this embodiment, the first sheet 11 is a glass sheet and the second sheet 12 is a transparent plate.

The first sheet 11 has two opposed main surfaces, a first main surface 11a and a second main surface 11c, and has edge surfaces on lateral-side edge portions 11b. The second sheet 12 has two opposed main surfaces, a first main surface 12a and a second main surface 12c, and has edge surfaces on lateral-side edge portions 12b. In the glass sheet composite 10, the first main surface 11a faces the first main surface 12a. The portions which extend from the edge surfaces of the edge portions 11b and 12b toward the centers of the main surfaces 11a, 11c, 12a, and 12c are referred to as "peripheries" in this embodiment. The term "main surface" means a surface through which light for viewing is emitted.

The seal material 30 adheres to the first main surface 11a of the first sheet 11, the first main surface 12a of the second sheet 12, and edge surfaces 21 of the liquid layer 20. Due to this configuration, not only the liquid layer 20 is sealed up by the seal material 30 and is hence prevented from leaking out but also the bonding of the first sheet 11, liquid layer 20, and second sheet 12 is enhanced to increase the strength of the glass sheet composite 10.

A vibrator 60 is disposed on that surface of the second sheet 12 which is on the reverse side from the main surface 12a, and the glass sheet composite 10 functions as a diaphragm. A vibrator 60 may have been disposed only on the second sheet 12 or only on the first sheet 11, or may have been disposed on each of the two sheets 11 and 12.

Methods for applying the light-shielding part 50, the seal material 30, and a liquid ingredient (liquid) for forming the liquid layer 20 are explained below.

(Light-Shielding Part)

For forming a light-shielding part 50, a fluid is applied in a given width to the main surface 11a of a first sheet 11 having, for example, a length of 100 mm, a width of 100 mm, and a thickness of 0.5 mm, in a peripheral area thereof near the edge portions 11b using a dispenser, etc. In this embodiment, the light-shielding part 50 is a coloring primer.

(Application of Seal Material)

Using a dispenser, a liquid ingredient is applied on the light-shielding part 50 in a width of 0.5 mm within the given width of the light-shielding part 50 so that the seal material 30 is line-drawn at a distance of, for example, 1 mm from the edge portions 11b.

(Application of Liquid Ingredient)

A liquid ingredient (oil ingredient) is applied with a disperser to a central portion (portion surrounded by the seal material 30) of the first sheet 11 to draw, for example, lines having a line width of 0.5 mm and a line spacing of 4 mm while leaving a 2-mm uncoated area between the applied liquid ingredient and the line of the applied seal material 30. With respect to the ejection amount of the liquid ingredient, the liquid ingredient is applied while controlling the mass thereof so that the liquid layer 20 to be formed through laminating has a thickness of 3 µm. For example, in the case where the region inside the line of the seal material 30 has a length of 100 mm and a width of 100 mm and a liquid ingredient having a density of 1 g/cm$^3$ is to be applied thereto in a thickness of 3 µm, the desired application may be attained by controlling the ejection mass so as to result in a total application amount of 0.03 g. In this procedure, either of the seal material 30 and the liquid ingredient for forming the liquid layer 20 may be applied first for line drawing.

A first sheet 11 having dimensions of 100 mm×100 mm×0.5 mm was prepared. A dimethyl silicone oil having a dynamic viscosity at 25° C. of 3,000 (mm$^2$/s) and a methyl phenyl silicone oil were evenly applied as liquid ingredients to the first sheet 11 using a dispenser (SHOTMASTER 400DS-s, manufactured by Musashi Engineering), while leaving an allowance having a width of 5 mm along the edge portions. Furthermore, a seal material (curable resin) 30 was applied in a line width of about 0.5 mm to the edge portions of the first sheet 11. The first sheet 11 and a second sheet 12 are laminated to each other, and thereafter the seal material 30 is cured.

(Laminating Step)

The seal material 30 and the liquid ingredient are applied in the steps described above, and the first sheet 11 thus coated and a second sheet 12 which is uncoated and is equal in kind and size to the first sheet 11 are laminated to each other under a reduced pressure. In the reduced-pressure laminating, the pressure is preferably 1,500 Pa or less, more preferably 300 Pa or less, still more preferably 100 Pa or less, especially desirably 10 Pa or less. After the laminating, the seal material 30 is cured by UV irradiation, heating, etc. in accordance with the mode of curing of the seal material 30 used.

During the laminating, the liquid ingredient (liquid) which has been applied inside spreads and comes into contact with the seal material 30 to apply force thereto from inside, and the seal material 30 spreads mainly outward. Although the seal material 30 spreads outward, the liquid ingredient does not leak out from the space between the first sheet 11 and the second sheet 12 because of surface tension exerted at the edge portions 11b and 12b of the sheets 11 and 12. A liquid layer 20 is thereby formed within the seal material 30. The surface of the seal material 30 where the liquid layer 20 and the seal material 30 are in contact with each other is a boundary 40.

The boundary 40 where the liquid layer 20 and the seal material 30 are in contact with each other lies in the area of the light-shielding part 50, so that when the glass sheet composite 10 is viewed in a plan view, the light-shielding part 50 overlays the boundary 40 between the liquid layer 20 and the seal material 30.

Although application to the main surface 11a of a first sheet 11 was explained above, the fluid for seal material formation and the liquid ingredient may be applied to the main surface 12a of a second sheet 12 before a first sheet 11 is laminated thereto.

Figure 2A:
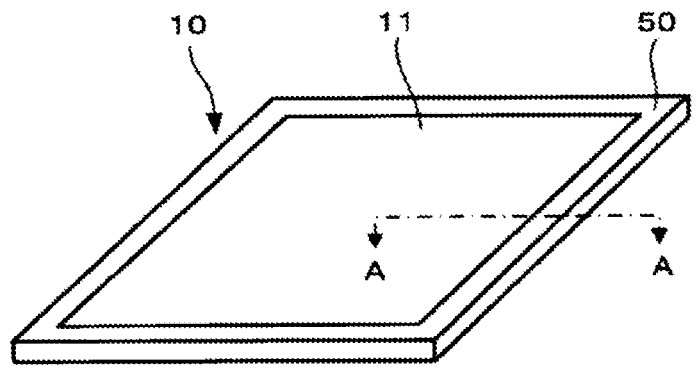
FIGS. 2A, 2B and 2C show examples of arrangement of the light-shielding parts of glass sheet composites according to the present invention.
Figure 2B:
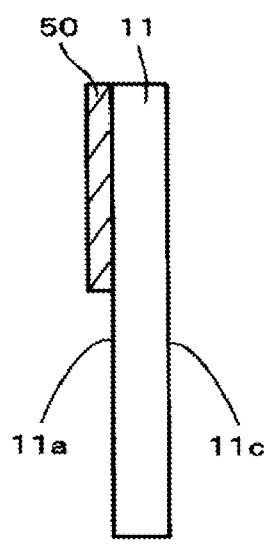
Figure 2C:
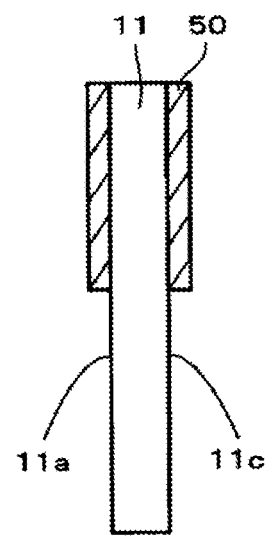

FIGS. 2A, 2B, and 2C show examples of where a light-shielding part 50 is formed by coating. FIG. 2B shows Example 1, in which a light-shielding part 50 was formed by coating only on the first main surface 11a of a first sheet 11, and FIG. 2C shows Example 2, in which a light-shielding part 50 was formed by coating on both surfaces of a first sheet 11, i.e., the first main surface 11a and the second main surface 11c. Although an example was shown in which a light-shielding part 50 was formed by coating only on the first main surface 11a in Example 1, a light-shielding part 50 may be formed by coating only on the second main surface 11c.

FIGS. 3A to 3E and FIGS. 4A to 4D show examples in which a light-shielding part 50 was formed by coating on either or both of two sheets 11 and 12, on one or both surfaces of each sheet. For the purpose of simplification, FIGS. 3A to 3E and FIGS. 4A to 4D show only the portions where light-shielding parts 50 were formed by coating, i.e., portions around the peripheries of the two sheets 11 and 12.

Figure 3A:
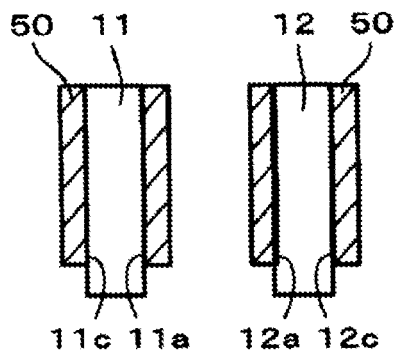
FIGS. 3A, 3B, 3C, 3D and 3E show examples of arrangement of the light-shielding parts of glass sheet composites according to the present invention.

FIG. 3A shows Example 3, in which a light-shielding part 50 was formed by coating on both main surfaces of each of a first sheet 11 and a second sheet 12.

Figure 3B:
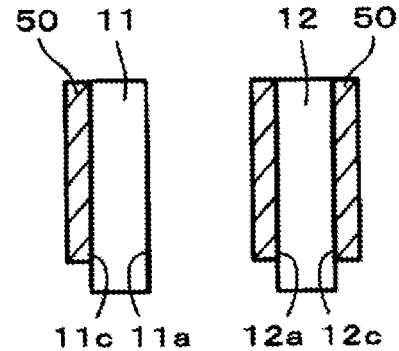

FIG. 3B shows Example 4, in which a light-shielding part 50 was formed by coating on the second main surface 11c of a first sheet 11 and on both main surfaces of a second sheet 12.

Figure 3C:
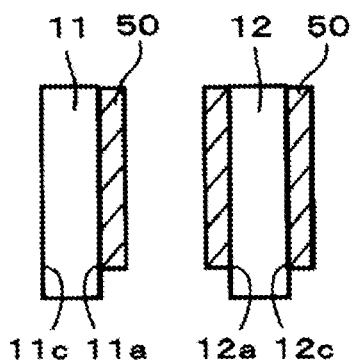

FIG. 3C shows Example 5, in which a light-shielding part 50 was formed by coating on the first main surface 11a of a first sheet 11 and on both main surfaces of a second sheet 12.

Figure 3D:
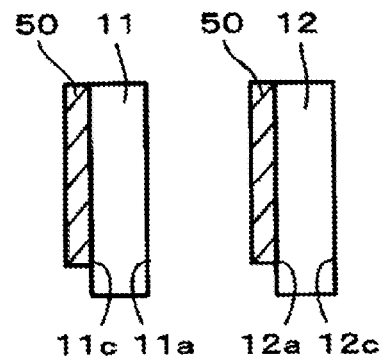

FIG. 3D shows Example 6, in which a light-shielding part 50 was formed by coating on the second main surface 11c of a first sheet 11 and on the second main surface 12a of a second sheet 12.

Figure 3E:
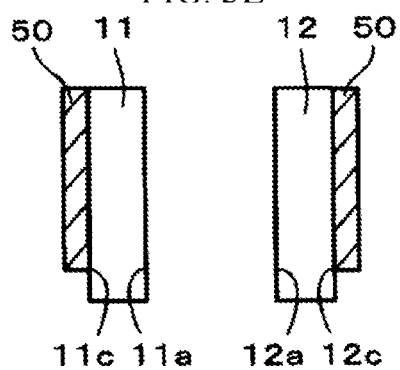

FIG. 3E shows Example 7, in which a light-shielding part 50 was formed by coating on the second main surface 11c of a first sheet 11 and on the second main surface 12c of a second sheet 12.

Figure 4A:
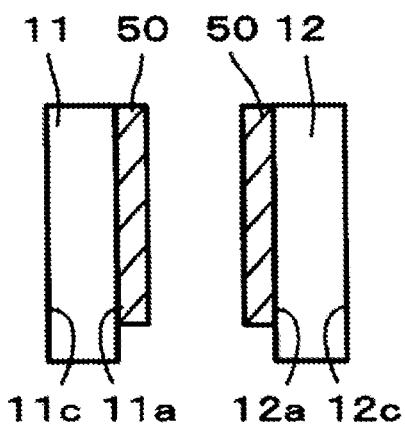
FIGS. 4A, 4B, 4C and 4D show examples of arrangement of the light-shielding parts of glass sheet composites according to the present invention.

FIG. 4A shows Example 8, in which a light-shielding part 50 was formed by coating on the first main surface 11a of a first sheet 11 and on the first main surface 12a of a second sheet 12.

Figure 4B:
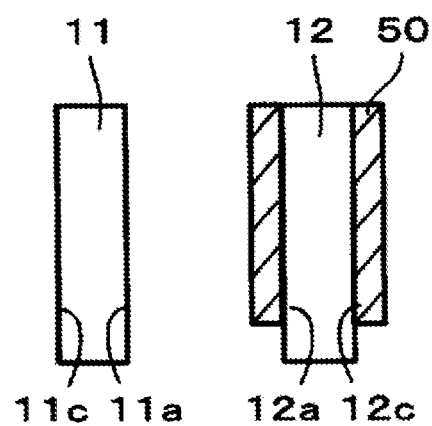

FIG. 4B shows Example 9, in which a light-shielding part 50 was formed by coating only on both surfaces of a second sheet 12.

Figure 4C:
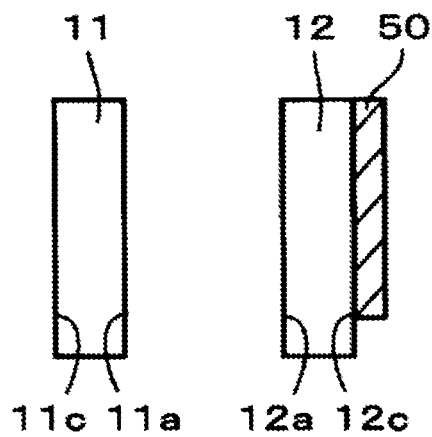

FIG. 4C shows Example 10, in which a light-shielding part 50 was formed by coating only on the second main surface 12c of a second sheet 12.

Figure 4D:
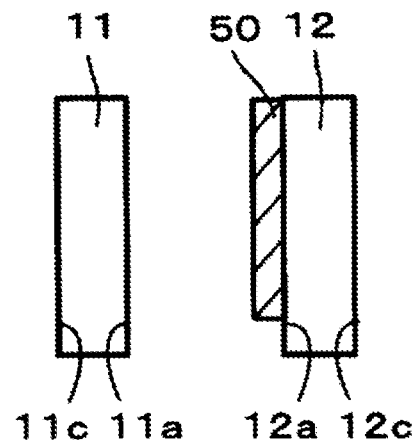

FIG. 4D shows Example 11, in which a light-shielding part 50 was formed by coating only on the first main surface 12a of a second sheet 12.

The light-shielding part 50 is not limited in the position of coating for formation thereof or in the shape, width, etc. thereof, so long as the boundary 40 between the liquid layer 20 and the seal material 30 can be concealed as in the examples shown in FIG. 2A to FIG. 4D.

Figure 5A:
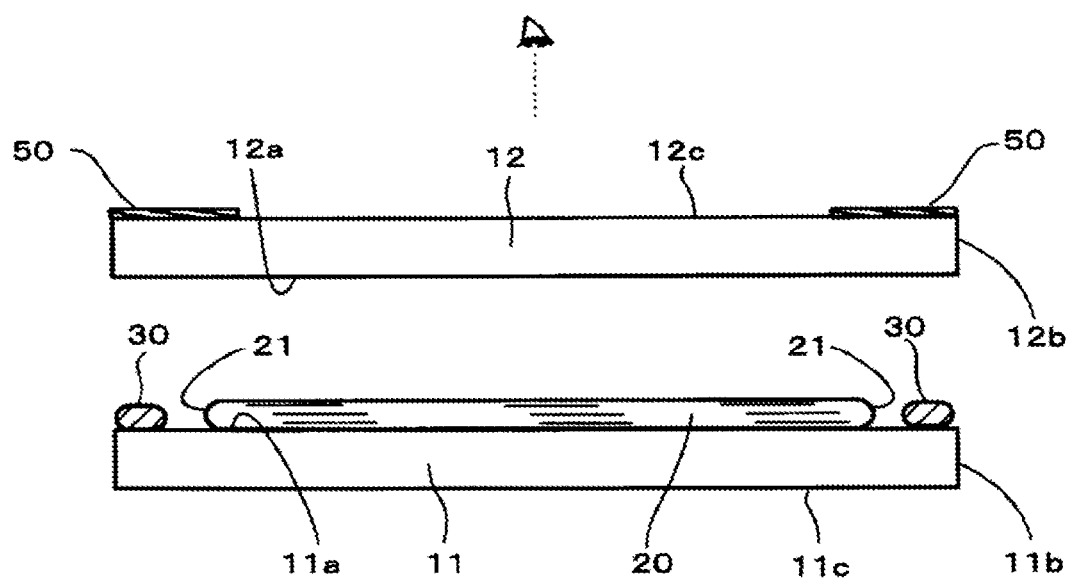
FIGS. 5A and 5B show a first sheet and a second sheet which are in the state of just before being laminated to each other in producing glass sheet composites according to the present invention.
Figure 5B:
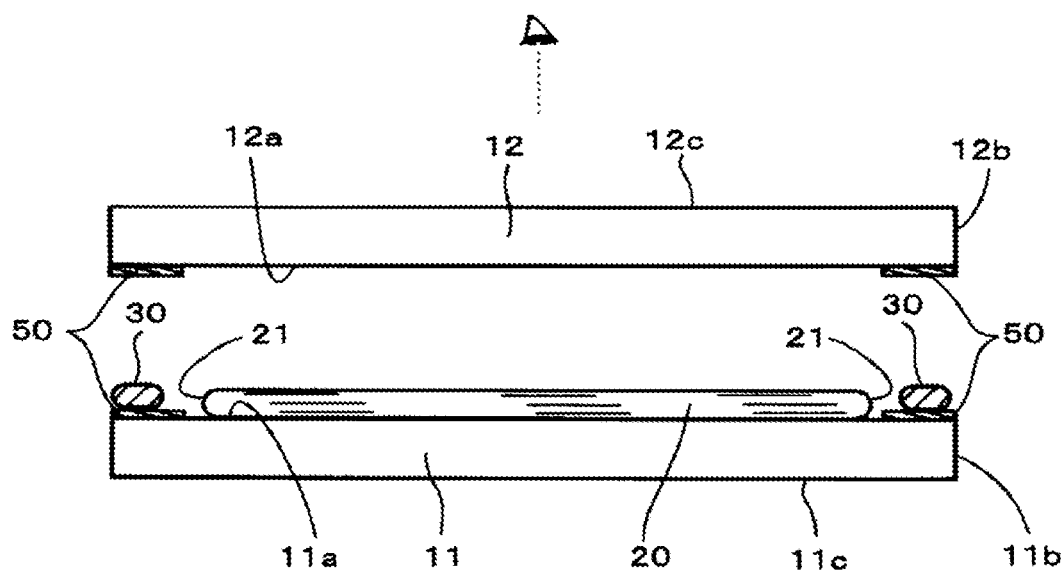

FIGS. 5A and 5B are diagrammatic views each showing a first sheet 11 and a second sheet 12 which are in the state of just before being laminated to each other. FIG. 5A shows an example in which a second sheet 12 having a light-shielding part 50 disposed thereon beforehand is bonded to a first sheet 11, making it possible to easily produce a glass sheet composite 10. FIG. 5B shows an example in which a seal material 30 adheres to the first main surface 11a and the first main surface 12a, with light-shielding parts 50 interposed therebetween, and this enhances the strength of the adhesion of the seal material 30 to the first sheet 11 and second sheet 12, thereby improving adhesion to the sheets 11 and 12.

FIG. 6 is a plan view showing an Example which includes a liquid layer 20 disposed in a different arrangement. Liquid layers 20 have been disposed in two positions near the center of the sheets 11 and 12. Seal materials 30 have been disposed by liquid-ingredient application so as to surround each liquid layer 20, and a light-shielding part 50 has been formed by fluid application over the whole first main surface 11a and the whole first main surface 12a of the sheets 11 and 12 so as to conceal the boundary 40 between each liquid layer 20 and the seal material 30. When a liquid layer 20 lies locally, a seal material 30 is disposed locally as well and, hence, the boundary 40 therebetween also lies locally. In this case, a light-shielding part 50 may be locally formed by fluid application so as to conceal the boundary 40.

The shape of the glass sheet composite 10 can be suitably designed in accordance with applications, and may be a flat platy shape or a curved shape. The glass sheet composite 10 may have the shape of a square, rectangle, right-angled triangle, circle, polygon, triangle, etc. in a front view.

(Edge Surface Processing)

Mirror polishing may be performed as edge surface processing. The shape of the edge surfaces in the edge portions 11b and 12b is selected while taking account of appearance, bonding strength, safety, etc.

The edge portions 11b of the first sheet 11 and the edge portions 12b of the second sheet 12 have edge surfaces which may form a single surface at each edge. Alternatively, the edge surfaces of the two sheets may be tapered into curved surfaces so that the edge surfaces of the seal material 30 are curved surfaces continuously connected to the taper surfaces. Only the edge surfaces of the edge portions 11b of the first sheet 11 may be tapered into curved surfaces.

The present invention is not limited to the embodiments described above, and modifications, improvements, etc. can be suitable made therein. The constituent elements in the embodiments are each not limited in the material, shape, dimensions, numerical values, form, number, place of disposition, etc. thereof so long as the present invention can be achieved.

The present invention is based on a Japanese patent application filed on Oct. 4, 2017 (Application No. 2017-194640), the contents thereof being incorporated herein by reference.

INDUSTRIAL APPLICABILITY

The glass sheet composite of the present invention is suitable for diaphragms for use in loudspeakers, microphones, earphones, mobile devices, etc.

REFERENCE SIGNS LIST

10 Glass sheet composite
11 First sheet
11a First main surface of first sheet
11b Edge portion of first sheet
11c Second main surface of first sheet
12 Second sheet
12a First main surface of second sheet
12b Edge portion of second sheet
12c Second main surface of second sheet
20 Liquid layer
30 Seal material
Boundary
50 Light-shielding part
60 Vibrator

The invention claimed is:

1. A glass sheet composite comprising
at least two sheets,
a liquid layer held between two adjacent sheets of the at least two sheets, and
a seal material disposed between the two sheets so as to seal up the liquid layer,
wherein
at least one of the two sheets is a glass sheet,
the glass sheet composite including a light-shielding part disposed so as to overlay a boundary between the liquid layer and the seal material when the glass sheet composite is viewed in a plan view, and the light-shielding part is positioned from the peripheral edge of at least one of the two sheets to a point beyond the internal edge of the seal material.

2. The glass sheet composite according to claim 1, wherein the seal material is provided to at least some of peripheries of the two sheets, and
the light-shielding part is provided to at least some of the peripheries of the two sheets so as to overlay the boundary.

3. The glass sheet composite according to claim 1, wherein the seal material is provided to peripheries of the two sheets and
the light-shielding part is provided to the whole peripheries of the two sheets so as to overlay the boundary.

4. The glass sheet composite according to claim 1, wherein the two sheets comprise a first sheet that is constituted of a glass sheet, and a second sheet that is constituted of a transparent plate and
the light-shielding part is provided to at least one main surface of the first sheet.

5. The glass sheet composite according to claim 1, wherein the two sheets comprise a first sheet that is constituted of a glass sheet, and a second sheet that is constituted of a transparent plate and
the light-shielding part is provided to at least one main surface of the second sheet.

6. A diaphragm comprising the glass sheet composite according to claim 1 and at least one vibrator disposed on one or both surfaces of the glass sheet composite.

7. The glass composite according to claim 1, wherein the liquid layer has a viscosity coefficient at 25° C. of $1\times10^{-4}$ to $1\times10^3$ Pa·s and a surface tension at 25° C. of 15-80 mN/m.

8. The glass composite according to claim 1, wherein the light shielding part is positioned only to a main surface on one or both sheets and one or both surfaces of the sheets.

9. A glass sheet composite comprising
at least two sheets,
a liquid layer held between two adjacent sheets of the at least two sheets, and
a seal material disposed between the two sheets so as to seal up the liquid layer,
wherein
at least one of the two sheets is a glass sheet,
the glass sheet composite including a light-shielding part disposed so as to overlay a boundary between the liquid layer and the seal material when the glass sheet composite is viewed in a plan view, and
the light-shielding part is positioned to at least some of the peripheries of the at least two sheets.

10. A glass sheet composite comprising
at least two sheets,
a liquid layer held between two adjacent sheets of the at least two sheets, and
a seal material disposed between the two sheets so as to seal up the liquid layer,
wherein
at least one of the two sheets is a glass sheet,
the glass sheet composite including a light-shielding part disposed so as to overlay a boundary between the liquid layer and the seal material when the glass sheet composite is viewed in a plan view, and
the light-shielding part is applied to at least some of the peripheries of both sheets and that the light-shielding part is positioned from the peripheral edge of the two sheets to a point beyond the internal edge of the seal material.

11. The glass sheet composite according to claim 1, wherein the at least two sheets comprise a first sheet that is a glass sheet, and a second sheet that is a transparent plate, and the light-shielding part is provided only on a main surface of the second sheet, the main surface not being faced to the liquid layer.

12. The glass sheet composite according to claim 1, wherein the light-shielding part is positioned on a main surface of a first sheet of the two sheets, the main surface facing the liquid layer, and the seal material is positioned on the light-shielding part.

13. The glass sheet composite according to claim 1, wherein the light-shielding part is positioned on a main surface of a first sheet of the at least two sheets, a main surface of the first sheet facing the liquid layer and on a main surface of a second sheet of the at least two sheets facing the liquid layer, and the seal material is positioned on the light-shielding part.

14. The glass sheet composite according to claim 1, wherein the light-shielding part comprises a resin containing a metallic filler.

15. The glass sheet composite according to claim 1, wherein the light-shielding part comprises a film of a metal.

16. The glass sheet composite according to claim 1, wherein the light-shielding part comprise a coloring primer that is a curable-resin agent.

17. The glass sheet composite according to claim 1, which has a loss coefficient at 25° C. of $1\times10^{-2}$ or higher and at least one sheet has a sheet-thickness-direction longitudinal wave acoustic velocity of $4.0\times10^3$ m/s or higher.

18. The glass sheet composite according to claim 1, wherein the liquid layer has a vapor pressure at 25° C. and 1 atm of $1\times10^4$ Pa or less.

19. The glass sheet composite according to claim 1, wherein when a total thickness of the at least two sheets is 1 mm or less, the liquid layer has a thickness of 1/10 or less of a total thickness of the at least two sheets.

20. The glass sheet composite according to claim 1, wherein when a total thickness of the at least two sheets is greater than 1 mm, the liquid layer has a thickness of 100 μm or less.

* * * * *